Patented Jan. 30, 1934

1,945,346

UNITED STATES PATENT OFFICE 1,945,346

BAKED FLOUR PRODUCT AND PROCESS FOR MAKING THE SAME

Albert K. Epstein and Benjamin R. Harris, Chicago, Ill.

No Drawing. Application August 15, 1930
Serial No. 475,633

10 Claims. (Cl. 99—10)

Our invention relates in general, to baked flour products, and processes for producing the same.

In the baking of certain types of cakes, a butterlike flavor is desired, and this is generally obtained by the use of butter for shortening purposes. The function of the shortening is to lubricate the cake batter, and also to emulsify a large volume of air, and retain the air in the cake during the manipulating and baking process. It is known, however, that butter is deficient in these respects and is not as satisfactory a shortening material as some other types of oleaginous substances such as, for example, hydrogenated cotton seed oil. In like manner, there are other conditions in baking in which either the shortening is sacrificed for the purpose of obtaining flavor, or the butter flavor is sacrificed for the purpose of obtaining satisfactory shortening. In no case, however, has it been possible heretofore to obtain the butterlike aroma in a baked flour product which was devoid of shortening.

One of the principal objects of our invention is to improve baked flour products.

Another object is the use of a separate butter flavoring substance with baked flour products, so that the butter flavor may be obtained with the best types of shortening agents.

Another object is to introduce the desired aromatic constituents in cake products without the aid of oleaginous material.

Another object is to impart a butterlike flavor to baked flour products which use no shortening.

Other objects, features and advantages of the invention will be more apparent from a consideration of the following detailed description.

In general, our invention consists in the use, with baked flour products, of improved types of butter flavoring substances. These substances, the use of which we prefer, are diketones of the general structure

in which R and R′ stand for ethyl, methyl, propyl, or similar groups, and in which such groups taken together contain at least two carbons, but not more than six, and in which the carbonyl groups are adjacent to each other. These substances are very valuable when used in accordance with our invention in imparting very desirable aroma to baked flour products.

While any members of the class set forth may be used with satisfaction in the practice of our invention, we have found that we can obtain unusually good results with diacetyl; 2,3 pentadione; 2,3 hexadione; 3,4 hexadione; and 3,4 heptadione. These substances may be used alone, but, in general, we have found the most satisfactory results obtainable by means of various combinations thereof, or various combinations of these with other members of the class. We have found that while all of the members of the class possess the same general butterlike flavor and aroma when used in relatively small quantities, each one has a slightly different odor than the others. The selection and use of these substances, therefore, is largely a matter of personal taste, and while we give specific examples hereinafter, it is obvious that many changes in proportions and combinations may be necessary if the individual tastes of all who practice the invention are to be satisfied.

As to the manner of producing the baked product, this will depend greatly upon the type of product which is being produced. There are various forms of cake, bread, biscuits, etc., with all of which our new flavoring substances may be used. The method of introduction is any which will bring about a sufficient dispersion of the flavoring material in the flour batter before baking. We shall refer more in detail hereinafter to the manner of effecting the necessary dispersions.

We have already stated that we have obtained the most satisfactory results (most satisfactory to our personal taste) by the use of combinations of the diketones described. In many respects, diacetyl in small proportions has all the most pleasing and delicate aroma of all of the substances of the class, but we have found that if diacetyl is used alone, it volatilizes considerably during the baking period and much larger amounts of the product must be used to obtain a noticeable result. It appears from our investigations that diketones having less than four carbons in the two R groups R and R′ taken together, when used alone, are all apt to volatilize too greatly during baking, for the most satisfactory results. We have found, however, that when the lower boiling point substances are mixed with the higher boiling point substances, a very fine aroma is obtained, and more of the lower boiling point substances remain in the product. The blending or mixing of the various diketones of the class, therefore, not only has an effect upon the aroma obtained, but has a marked effect upon the amount of the products required for use. These diketones have so penetrating an odor and taste, that they have a pleasing effect only when used in relatively small proportions and they must, of course, be introduced in such a manner as to obtain the proper dispersion. We have found that this is brought about most satisfactorily by diluting the diketones in either oil or aqueous substances before introducing the same into the batter.

One example of an improved way of making a proper mixture is to take three parts of diacetyl and one part of 2,3 pentadione and dissolve the same into a suitable proportion of a solvent. A specific example is the use of two and one-half ounces of diacetyl with three-fourths of an ounce of hexadione and dissolve the same in one hundred ounces of water. We have also obtained good results by the use of two ounces of diacetyl, one-half of an ounce of 2,3 pentadione, and one-half of an ounce of 2,3 hexadione, dissolved in one hundred ounces of water, the resulting mixture in solution making a very good flavoring base for cakes.

As previously stated, the amount of flavoring substance used with the cake and the type thereof may vary, depending upon personal taste. We find, however, that in flavoring a batch of eighty pounds of cake batter, two to three ounces of the above mixtures were ample to impart sufficient butter aroma to the finished product.

Instead of dissolving the diketones in water, we have found that they may be dissolved in other aqueous substances such as milk or eggs. When dissolved in eggs, this may either be the whole egg, or the white, or yolk, alone. Other types of substances, which may be aqueous in character, in which the diketones may be dissolved or dispersed, are flavoring extracts such as vanilla or coumarin.

We have also found that the diketones of our invention may be dissolved in oil or other suitable oleaginous solvent. While very good results are obtained by using an oleaginous solvent, we have found that there are certain cases in which the use of oleaginous substances in the cake material is entirely unsatisfactory and so the preferred use of the substances of the invention is in connection with aqueous solvent.

When applying the flavoring substances of our invention to pound cakes or other cakes which employ shortening, the cake may be produced with the best shortening material obtainable, so as to obtain the maximum volume and the best texture. In this case, the diketone may be dissolved in the shortening material. In the use of the flavoring substances with sponge cake or angel food cake, no shortening material of any kind is used, but the substance is added directly to the batter in an aqueous solution with sufficient beating to obtain the necessary dispersion. It may be stated, however, that due to the character of these substances, it will be found that they will penetrate the entire batter quite readily, even though complete dispersion is not obtained.

The specific manner of incorporating the flavoring substances may vary greatly as desired, and must be varied at certain times and with certain types of products. When the batter is made with shortening, or eggs, or other substances in which the flavoring substances may be dissolved or dispersed, the usual amount of such substances may be employed in producing the batter and the proper flavor will be obtained. Thus, the flavoring is introduced as an incident to the production of the batter. But the batter may be entirely completed first, if desired, and the flavoring then introduced, suitably diluted by a proper solvent such as plain water, coumarin water, a liquid oleaginous substance, or the like.

Our invention may be practiced with any flour product; by which we mean any product usually made either wholly or in part from a ground cereal or grain. By baked, we include any of the usual processes of applying heat to render the flour product suitable for eating. The invention, therefore, may be used with all forms of pastries, cakes, breads, rolls and the like, and the term baked flour product as used in the claims is intended to refer to any of these and similar products.

It appears from the preceding description that very great advantages are secured by the practice of our invention, whatever type of baking flour product is being produced. In the case of cakes which employ shortening substances it is obvious that the baker can use the very best type of shortening for his purpose, thus obtaining the best volume, grain, and texture in the cake which it is possible to obtain. Very often this will be attended with an actual saving in cost to the baker. We are then able to obtain the very choicest aroma with the cake having the very best volume, grain, and texture, by the use of our flavoring substances. In actual fact, we can obtain a uniform product with a better aroma than can be obtained by the use of butter. It is known that butter does not run uniformly, while our substances can be made entirely uniform.

There is a kind of pastry known as "puff pastry" with which our invention may be practiced with unusually good results. In producing this type of pastry a relatively thin layer of batter is produced, over which is spread a thin layer of an oleaginous lubricating material. The pastry is then folded a number of times, rolled out, refolded, and again rolled out so that a final product is obtained consisting of a large number of thin layers of flour batter separated by extremely thin films of oleaginous material. The oleaginous material in this case acts as a lubricant and to separate the layers, and also serves to hold air and moisture between the layers, which on baking, expands and causes a puffing up of the product to several times its normal thickness. Butter is entirely unsuited for use with this type of product, as its melting point is too low and it does not have the proper viscosity characteristics which are needed to make the most approved product. Its most serious disadvantage is that it does not maintain the layers of flour batter separated.

This is a very good example of a useful advantage of our invention. The use of a butter flavor with this type of pastry is desirable, but has never been accomplished satisfactorily. We are permitted to select the most advantageous lubricant and separating material to place between layers of the batter and the butter flavor may be obtained by our diketone products.

Although we have described the features of our invention in considerable detail to enable those skilled in the art to practice the same, it is obvious that we do not restrict ourselves to the specific features described, the invention being limited only by the scope of the appended claims.

What we claim is new and desire to protect by Letters Patent of the United States is:

1. A process for producing an improved baked flour product, which includes the step of adding thereto a relatively small amount of a diketone having the general structure

in which "R" and "R'" stand for ethyl, methyl, propyl and similar groups, and in which the groups R and R' taken together contain at least two carbons but not more than six, and in which the carbonyl groups are adjacent to each other.

2. A process for producing an improved baked flour product, which includes adding thereto a relatively small amount of the diketone diacetyl and another diketone having the general structure $$\begin{array}{c} R-C=O \\ | \\ R'-C=O \end{array}$$

in which "R" and "R'" stand for ethyl, methyl, propyl and similar groups, and in which the groups R and R' taken together contain at least two carbons but not more than six, and in which the carbonyl groups are adjacent to each other.

3. A process for producing an improved baked flour product which includes forming a flour batter, producing a solution of a diketone having the general structure $$\begin{array}{c} R-C=O \\ | \\ R'-C=O \end{array}$$

in which "R" and "R'" stand for ethyl, methyl, propyl and similar groups, and in which the groups R and R' taken together contain at least two carbons but not more than six, and in which the carbonyl groups are adjacent to each other, dispersing the solution into the batter, and baking the batter.

4. A process for producing an improved baked flour product, which includes forming a flour batter, producing an aqueous solution of a diketone having the general structure $$\begin{array}{c} R-C=O \\ | \\ R'-C=O \end{array}$$

in which "R" and "R'" stand for ethyl, methyl, propyl and similar groups, and in which the groups R and R' taken together contain at least two carbons but not more than six, and in which the carbonyl groups are adjacent to each other, forming a flour batter from ingredients including said solution, and baking the batter.

5. A process for producing an improved baked flour product, which includes forming a flour batter, producing an aqueous solution of a diketone having the general structure $$\begin{array}{c} R-C=O \\ | \\ R'-C=O \end{array}$$

in which "R" and "R'" stand for ethyl, methyl, propyl and similar groups, and in which the groups R and R' taken together contain at least two carbons but not more than six, and in which the carbonyl groups are adjacent to each other, dispersing a relatively small amount of said solution in the batter and baking the batter.

6. A process for producing an improved baked flour product, which includes dispersing in egg material a relatively small amount of a diketone having the general structure $$\begin{array}{c} R-C=O \\ | \\ R'-C=O \end{array}$$

in which "R" and "R'" stand for ethyl, methyl, propyl and similar groups, and in which the groups R and R' taken together contain at least two carbons but not more than six, and in which the carbonyl groups are adjacent to each other, forming a batter including said egg material and baking the batter.

7. A baked flour product having contained therein a non-butter shortening material, and a relatively small amount of a diketone having the general structure $$\begin{array}{c} R-C=O \\ | \\ R'-C=O \end{array}$$

in which "R" and "R'" stand for ethyl, methyl, propyl and similar groups, and in which the groups R and R' taken together contain at least two carbons but not more than six, and in which the carbonyl groups are adjacent to each other.

8. A baked flour product without shortening, and including a relatively small amount of a diketone having the general structure $$\begin{array}{c} R-C=O \\ | \\ R'-C=O \end{array}$$

in which "R" and "R'" stand for ethyl, methyl, propyl and similar groups, and in which the groups R and R' taken together contain at least two carbons but not more than six, and in which the carbonyl groups are adjacent to each other.

9. A baked flour product having included therein a relatively small amount of a mixture of diketones, each having the general structure $$\begin{array}{c} R-C=O \\ | \\ R'-C=O \end{array}$$

in which "R" and "R'" stand for ethyl, methyl, propyl and similar groups, and in which the groups R and R' taken together contain at least two carbons but not more than six, and in which the carbonyl groups are adjacent to each other.

10. A baked flour product having included therein a relatively small amount of the diketone diacetyl and another diketone having the general structure $$\begin{array}{c} R-C=O \\ | \\ R'-C=O \end{array}$$

in which "R" and "R'" stand for ethyl, methyl, propyl and similar groups, and in which the groups R and R' taken together contain at least two carbons but not more than six, and in which the carbonyl groups are adjacent to each other.

ALBERT K. EPSTEIN.
BENJAMIN R. HARRIS.